US012690088B2

(12) United States Patent
Li

(10) Patent No.: US 12,690,088 B2
(45) Date of Patent: Jul. 21, 2026

(54) BEAM CONFIGURATION METHOD, BEAM CONFIGURATION APPARATUS AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 385 days.

(21) Appl. No.: 18/548,263

(22) PCT Filed: Mar. 4, 2021

(86) PCT No.: PCT/CN2021/079163
§ 371 (c)(1),
(2) Date: Aug. 29, 2023

(87) PCT Pub. No.: WO2022/183454
PCT Pub. Date: Sep. 9, 2022

(65) Prior Publication Data
US 2024/0138017 A1    Apr. 25, 2024
US 2024/0237123 A9    Jul. 11, 2024

(51) Int. Cl.
*H04W 76/20* (2018.01)
*H04B 17/318* (2015.01)
*H04L 5/00* (2006.01)
*H04W 72/231* (2023.01)

(52) U.S. Cl.
CPC .......... *H04W 76/20* (2018.02); *H04B 17/328* (2023.05); *H04L 5/0051* (2013.01); *H04W 72/231* (2023.01)

(58) Field of Classification Search
CPC .... H04B 7/022; H04B 7/0695; H04B 17/328; H04L 5/0051; H04W 24/02; H04W 72/02; H04W 72/046; H04W 72/231; H04W 76/20
See application file for complete search history.

(56) References Cited

U.S. PATENT DOCUMENTS

| 12,185,404 B2 * | 12/2024 | Tsai | ................... H04B 7/06964 |
| 2022/0149918 A1 * | 5/2022 | Miao | ..................... H04B 7/088 |
| 2022/0295589 A1 * | 9/2022 | Tsai | ................... H04B 7/06964 |

(Continued)

FOREIGN PATENT DOCUMENTS

| CN | 111543024 A | 8/2020 |
| WO | 2019212224 A1 | 11/2019 |

OTHER PUBLICATIONS

International Search Report and Written Opinion of International Application No. PCT/CN2021/079163, dated Nov. 24, 2021, 18 pages.

(Continued)

*Primary Examiner* — Eric Nowlin
(74) *Attorney, Agent, or Firm* — Finnegan, Henderson, Farabow, Garrett & Dunner, L.L.P.

(57) ABSTRACT

A beam configuration method is performed by a terminal, and includes: determining one or more transmission configuration indication (TCI) states of a control resource set (CORESET); wherein one or more reference signal resources indicated by the one or more TCI states are associated with at least one of: a serving cell of the terminal; or a neighboring cell of the terminal.

20 Claims, 6 Drawing Sheets

(56) References Cited

U.S. PATENT DOCUMENTS

| | | | |
|---|---|---|---|
| 2022/0338235 A1* | 10/2022 | Bagheri | H04L 5/0094 |
| 2023/0163914 A1* | 5/2023 | Koskela | H04L 5/0053 370/242 |
| 2023/0300604 A1* | 9/2023 | Zhou | H04W 8/24 370/328 |
| 2024/0106606 A1* | 3/2024 | He | H04L 5/0053 |

OTHER PUBLICATIONS

FutureWEI, "Beam management for simultaneous multi-TRP transmission with multi-panel reception", 3GPP TSG RAN WG1 Meeting #103-e, R1-2007542, e-Meeting, Oct. 26-Nov. 13, 2020, 4 pages.
Office Action issued by the India Patent Office on Dec. 17, 2024, in corresponding Application No. IN 2023-47065465, 6 pages.

* cited by examiner

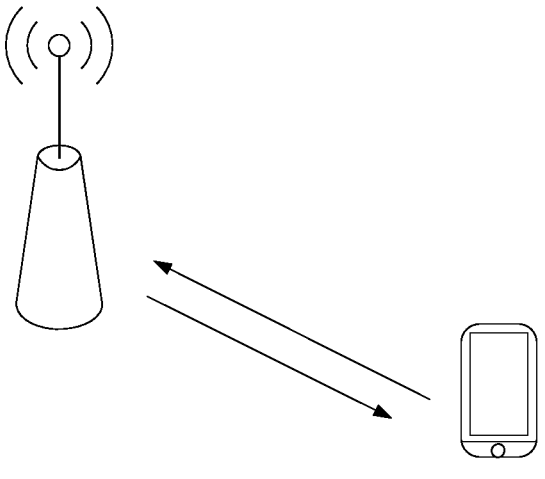

| determine one or more TCI states of a CORESET, in which one or more reference signal resources indicated by the one or more TCI states are associated with at least one of a serving cell of the terminal or a neighboring cell of the terminal |
|---|

| in response to the terminal being configured to perform a communication transmission with a plurality of TRPs, and the plurality of TRPs being TRPs of the serving cell of the terminal, determine that one or more reference signal resources indicated by the TCI states are associated with one or more TRPs of the serving cell of the terminal |
|---|

FIG. 3 in response to the terminal being configured to perform a communication transmission with a plurality of TRPs, the plurality of TRPs include TRPs of the serving cell of the terminal and TRPs of the neighboring cell of the terminal, determine that the one or more reference signal resources indicated by the one or more TCI states are associated with one or more TRPs of the serving cell and/or the neighboring cell of the terminal

S41 in response to receiving an indication signaling from a network device, determine the one or more TCI states based on the indication signaling

FIG. 5

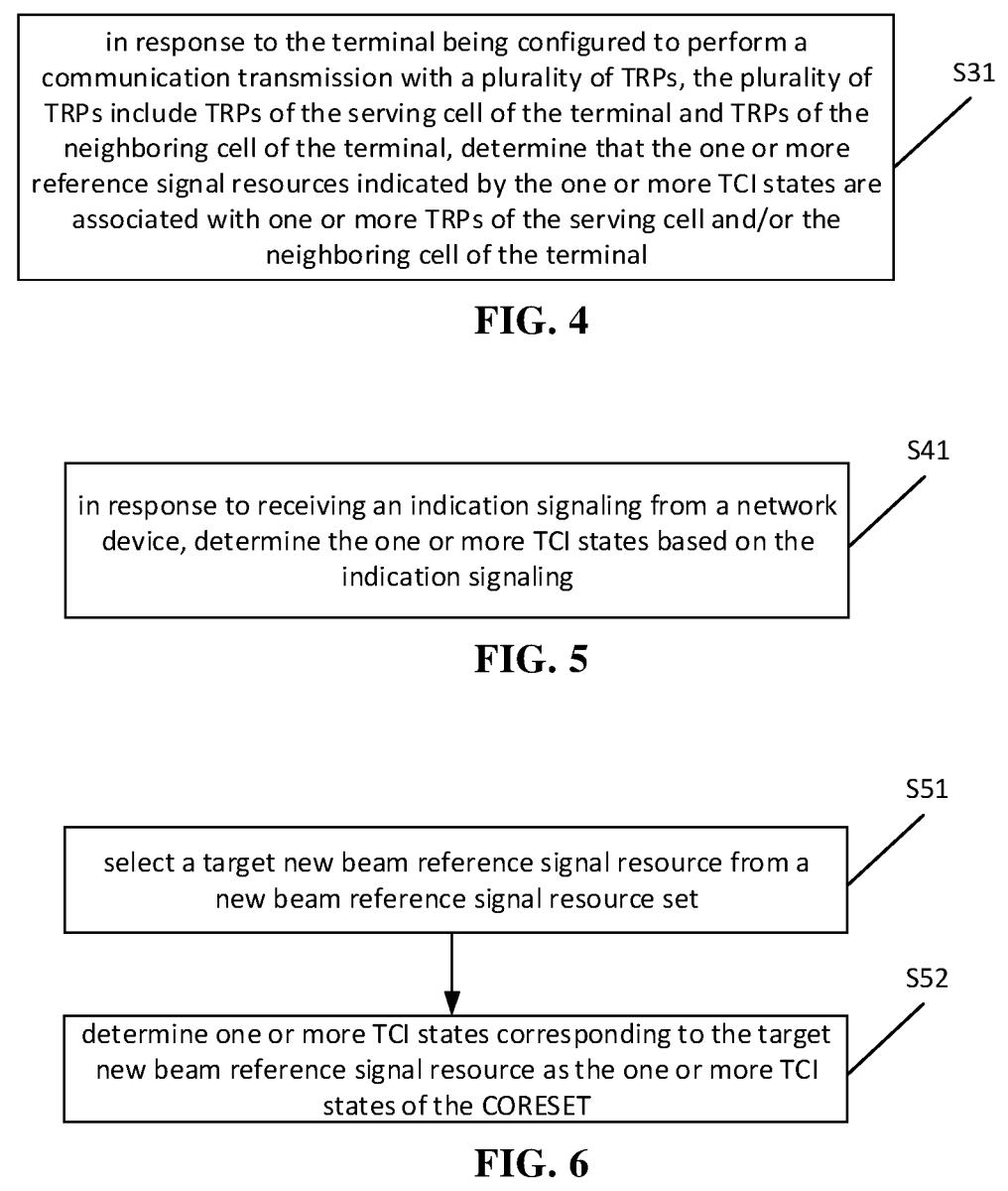

S51 select a target new beam reference signal resource from a new beam reference signal resource set

S52 determine one or more TCI states corresponding to the target new beam reference signal resource as the one or more TCI states of the CORESET

FIG. 6 configure one or more TCI states of a CORESET for a terminal, in which one or more reference signal resources indicated by the one or more TCI states are associated with at least one of a serving cell of the terminal or a neighboring cell of the terminal

Figures 7, 8, 9, 10:
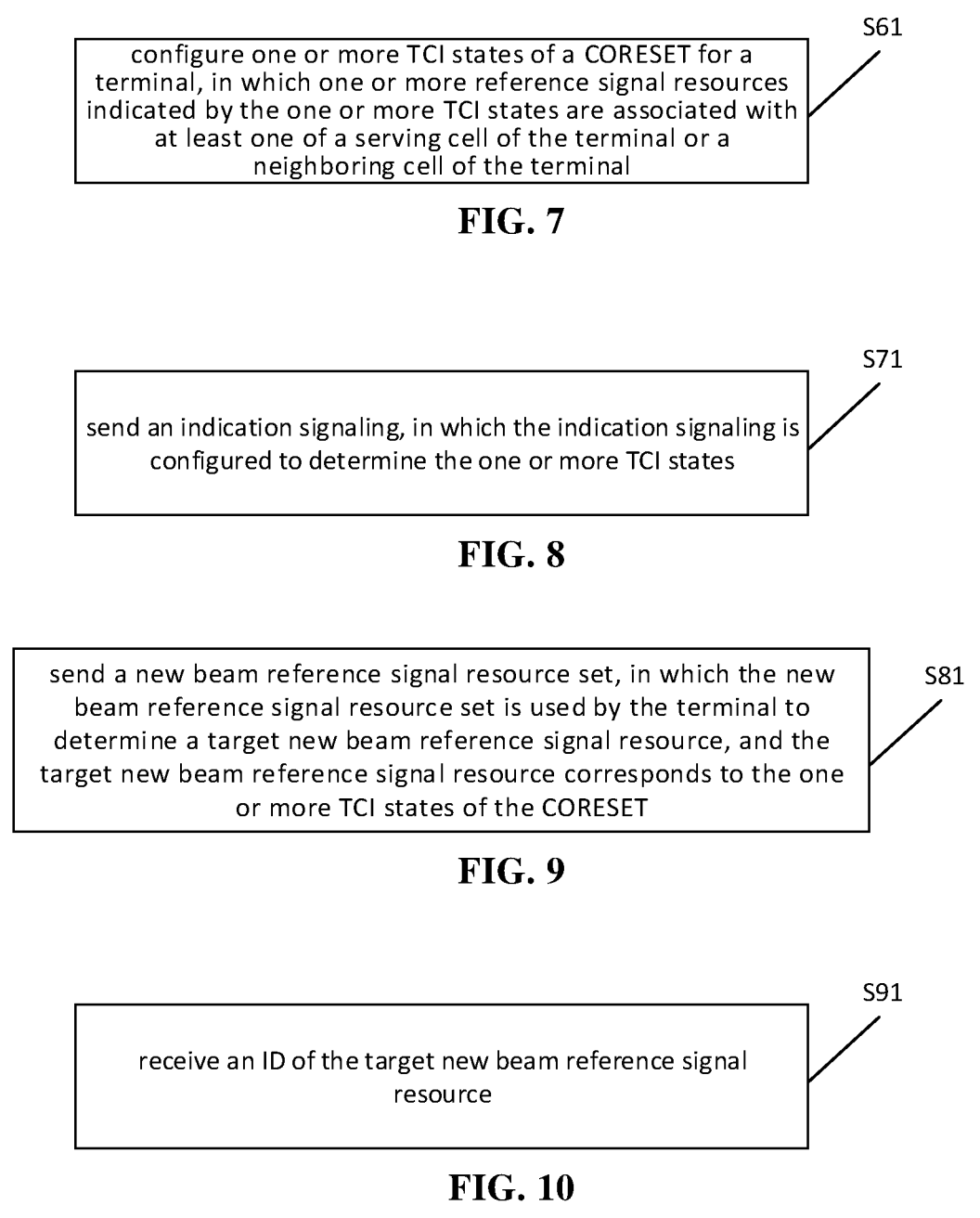

S61

FIG. 7 send an indication signaling, in which the indication signaling is configured to determine the one or more TCI states

S71

FIG. 8 send a new beam reference signal resource set, in which the new beam reference signal resource set is used by the terminal to determine a target new beam reference signal resource, and the target new beam reference signal resource corresponds to the one or more TCI states of the CORESET

S81

FIG. 9 receive an ID of the target new beam reference signal resource

BEAM CONFIGURATION METHOD, BEAM CONFIGURATION APPARATUS AND STORAGE MEDIUM

CROSS-REFERENCE TO RELATED APPLICATION

This application is a national phase of International Application No. PCT/CN2021/079163, filed on Mar. 4, 2021, the content of which is hereby incorporated by reference in its entirety.

TECHNICAL FIELD

The disclosure relates to a field of communication technology, in particular to a beam configuration method, a beam configuration apparatus and a storage medium.

BACKGROUND

In a New Radio (NR) technology, for example, when a communication frequency band is in frequency range 2 (FR2), beam-based transmission and reception is required to ensure a coverage range due to faster attenuation of high-frequency channels. When a network device (e.g., a base station) has a plurality of Transmission Reception Points (TRPs), Multi-TRP can be used to provide services to a terminal. For example, the Multi-TRP can be used to send a physical downlink control channel (PDCCH) to the terminal.

SUMMARY

According to a first aspect of the disclosure, a beam configuration method, performed by a terminal, is provided. The method includes:

determining one or more transmission configuration indication (TCI) states of a Control Resource Set (CORE-SET), in which one or more reference signal resources indicated by the one or more TCI states are associated with at least one of a serving cell of the terminal or a neighboring cell of the terminal.

According to a second aspect of the disclosure, a beam configuration method, performed by a network device, is provided. The method includes:

configuring one or more transmission configuration indication (TCI) states of a Control Resource Set (CORE-SET) for a terminal, in which one or more reference signal resources indicated by the one or more TCI states are associated with at least one of a serving cell of the terminal or a neighboring cell of the terminal.

According to a third aspect of the disclosure, a beam configuration device is provided. The device includes:

a processor and a memory for storing instructions executable by the processor; in which the processor is configured to perform the beam configuration method of the first aspect or any implementation of the first aspect.

It is understandable that the above general description and the following detailed descriptions are illustrative and explanatory only and do not limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

FIG. 1 is a structural diagram illustrating a communication system according to an example embodiment.

FIG. 2 is a flowchart illustrating a beam configuration method according to an example embodiment.

FIG. 3 is a flowchart illustrating a beam configuration method according to an example embodiment.

FIG. 4 is a flowchart illustrating a beam configuration method according to an example embodiment.

FIG. 5 is a flowchart illustrating a beam configuration method according to an example embodiment.

FIG. 6 is a flowchart illustrating a beam configuration method according to an example embodiment.

FIG. 7 is a flowchart illustrating a beam configuration method according to an example embodiment.

FIG. 8 is a flowchart illustrating a beam configuration method according to an example embodiment.

FIG. 9 is a flowchart illustrating a beam configuration method according to an example embodiment.

FIG. 10 is a flowchart illustrating a beam configuration method according to an example embodiment.

DETAILED DESCRIPTION

Figure 11:
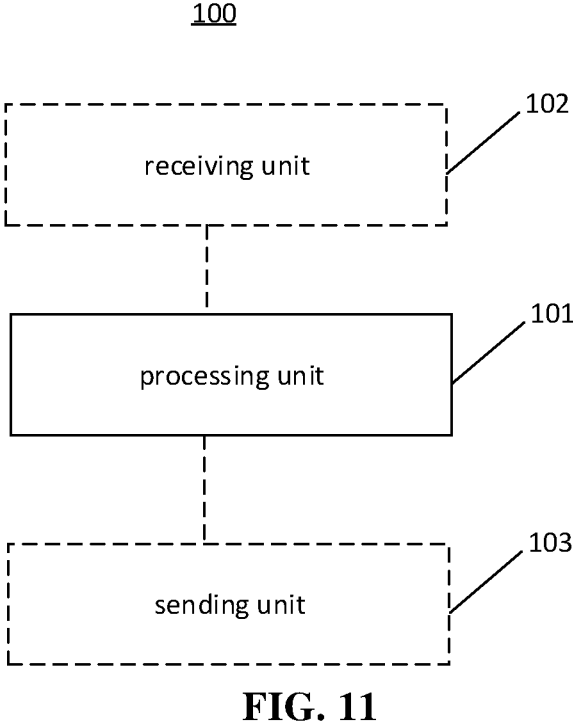
FIG. 11 is a block diagram illustrating a beam configuration apparatus according to an example embodiment.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The beam configuration methods according to the embodiments of the disclosure may be applied in a wireless communication system illustrated in FIG. 1. As illustrated in FIG. 1, the wireless communication system includes a terminal and a network device. The terminal is connected to the network device via radio resources for transmitting and receiving data.

It is understandable that the wireless communication system illustrated in FIG. 1 is only for schematic illustration, and other network devices may be included in the wireless communication system, such as a core network device, a wireless relay device and a wireless backhaul device, which are not illustrated in FIG. 1. The number of network devices and the number of terminals included in the wireless communication system are not limited in the embodiments of the disclosure.

It is further understandable that the wireless communication system according to the embodiments of the disclosure is a network that provides the wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Depending on factors such as capacity, rate, and delay of different networks, the network can be classified as a second Generation (2G) network, a 3G network, a 4G network, or a future evolved network, such as a 5G network, which can also be called a new radio (NR) network. For easy of description, in this disclosure, sometimes the wireless communication network is simply referred to as a network.

The network device involved in the disclosure may also be referred to as a radio access network device. The radio access network device may be: a base station, an evolved base station (evolved node B, i.e., eNB), a femtocell, an access point (AP) in a wireless fidelity (WIFI) system, a radio relay node, a radio backhaul node, a transmission point (TP), a transmission and reception point (TRP), a gNB in an NR system, or components or a part of the devices that constitute the base station. When the communication system is a vehicle to everything (V2X) communication system, the network device is a vehicle-mounted device. It is understandable that the specific technology and the specific device form used by the network device are not limited in the embodiments of the disclosure.

The terminal involved in the disclosure may also be referred to as a terminal device, a user equipment (UE), a mobile station (MS), or a mobile terminal (MT), which is a device that provides voice and/or data connectivity to a user. For example, the terminal can be a handheld device or a vehicle-mounted device with a wireless connectivity function. For example, the existing terminals include a mobile phone, a pocket personal computer (PPC), a handheld computer, a personal digital assistant (PDA), a laptop, a tablet computer, a wearable device, or a vehicle-mounted device, etc. In addition, when the communication system is a V2X communication system, the terminal device may be a vehicle-mounted device. It is understandable that the specific technology and the specific device form used by the terminal are not limited in the embodiments of this disclosure.

In the related art, in a scheme in which a plurality of transmission and reception points (Multi-TRP) is used to transmit a physical downlink control channel (PDCCH), transmission configuration indication (TCI) states may be configured for the terminal to receive the PDCCH, i.e., receiving beams are configured. For example, a Control Resource Set (CORESET) is configured for the terminal, a TCI state corresponding to the CORESET is configured, and a Search Space set (SS set) is also configured for the terminal, which is associated with the configured CORESET. When the terminal receives the PDCCH in the SS set, a beam corresponding to the configured TCI state is used for reception. Currently, one SS set is associated with one CORESET, and one CORESET is configured with one TCI state. Moreover, the beam configured for the CORESET is a beam corresponding to a TRP of a serving cell of the terminal. However, when the Multi-TRP is used to provide a service to the terminal, the service can be provided through TRPs of a neighboring cell. Therefore, how to configure beams in a scenario in which the Multi-TRP is used to provide a service to the terminal needs to be further optimized.

In the disclosure, the data transmission between the network device and the terminal is performed based on beams. In the related art, the network device sends a PDCCH for the terminal using one TRP, configures a beam to send and/or a beam to receive the PDCCH for the terminal, and indicates this via a TCI state. The TCI state is configured to indicate a Quasi co-location or Quasi co-located relationship between the PDCCH and a reference signal resource indicated by the TCI state. The configuring manner is as follows. One CORESET, such as CORESET #1, is configured for the terminal, and the TCI state corresponding to the CORESET #1 is TCI #1. Then, one SS set is configured for the terminal, which is associated with the CORESET #1. Therefore, the terminal receives the PDCCH on the resource in the SS set using a beam corresponding to a reference signal indicated by the TCI #1, i.e., the PDCCH and the reference signal indicated by the TCI #1 are Quasi co-located. Currently, one SS set can only be associated with one CORESET, and one CORESET is configured with only one TCI state.

When the network device (e.g., a base station) has a plurality of TRPs, the network device may use a plurality of TRPs (which is also referred to as Multi-TRP) to provide services for the terminal, including using the plurality of TRPs to send the PDCCH for the terminal. When the plurality of TRPs is used to send the PDCCH for the terminal, different TRPs use different beams for sending.

A typical value related to the Multi-TRP is 2. The following embodiments are illustrated by taking the number of PDCCHs sent by the Multi-TRP for the terminal being 2 as an example.

For the beams of CORESET #0 in the Rel-15/16, there are two methods for the terminal to determine the beams.

In the first method, the terminal detects Synchronization Signal and PBCH blocks (SSBs) sent by the network device before performing the random access procedure. If a reference signal received power (RSRP) of a SSB is greater than a threshold, the terminal uses a beam corresponding to the SSB to send a random access preamble corresponding to the SSB on a random access time-frequency resource corresponding to the SSB. Meanwhile, the terminal and the network device determine the beam corresponding to the SSB as a beam corresponding to the CORESET #0.

In the second method, the network device determines the beams of the CORESET #0 by indicating TCI states corresponding to the CORESET #0 via a signaling.

In the above method, all beams of the CORESET #0 correspond to beams corresponding to the TRPs of the serving cell. However, in Rel-17, the centric mobility of Layer 1-Layer 2 (L1-L2) is considered in Multi-beam, Multi-TRP of different cells is considered in inter-cell Multi-TRP, and multi-TRP of different cells is considered in beam management for Multi-TRP. In these cases, whether the TCI states of the CORESET #0 can be associated with a reference signal (RS) of the neighboring cell is a question that needs to be addressed, in which the neighboring cell can also be referred to as non-serving cell.

The embodiments of the disclosure provide a beam configuration method. In the beam configuration method, TCI state(s) of a CORESET is determined, and it is determined whether a TCI state is associated with a reference signal resource of a neighboring cell.

In an implementation, in the beam configuration method according to the embodiments of the disclosure, the CORESET is configured with one or more TCI states. The reference signal resource(s) indicated by the one or more TCI states are associated with the serving cell and/or the neighboring cell of the terminal. One TCI state indicates one or more reference signal resources. The one or more reference signal resources may all be associated with the same TRP. Or, different reference signal resources in the one or more reference signal resources are associated with different TRPs respectively. If the one or more reference signal resources indicated by a TCI state are associated with the serving cell of the terminal it represents that a cell identifier (ID) corresponding to the one or more reference signal resources indicated by the TCI state is a cell ID of the serving cell. If the one or more reference signal resources indicated by a TCI state are associated with the neighboring cell of the terminal, it represents that a cell ID corresponding to the one or more reference signal resources indicated by the TCI state is a cell ID of the neighboring cell. The cell ID may be a physical cell ID, an index after renumbering, or a flag used to distinguish the serving cell and the non-serving cell.

FIG. 2 is a flowchart illustrating a beam configuration method according to an example embodiment. As illustrated in FIG. 2, the beam configuration method is performed by the terminal. The method includes the following.

At step S11, one or more TCI states of a CORESET are determined.

One or more reference signal resources indicated by the one or more TCI states of the CORESET are associated with at least one of: a serving cell of the terminal or a neighboring cell of the terminal.

In one aspect, in the beam configuration method according to the embodiments of the disclosure, the one or more reference signal resources indicated by the one or more TCI states of the CORESET are associated with the serving cell of the terminal.

In the beam configuration method according to the embodiments of the disclosure, the one or more TCI states of the CORESET may be associated with reference signal resources of the serving cell and not associated with reference signal resources of the neighboring cell.

In another aspect, in the beam configuration method according to the embodiments of the disclosure, the one or more reference signal resources indicated by the one or more TCI states of the CORESET are associated with the neighboring cell of the terminal.

In the beam configuration method according to the embodiments of the disclosure, the one or more TCI states of the CORESET may be associated with the reference signal resources of the neighboring cell and not associated with the reference signal resources of the serving cell.

In still another aspect, In the beam configuration method according to the embodiments of the disclosure, some of the one or more reference signal resources indicated by the one or more TCI states of the CORESET are associated with the serving cell of the terminal, and some of the one or more reference signal resources indicated by the one or more TCI states of the CORESET are associated with the neighboring cell of the terminal.

In yet another aspect, in the beam configuration method according to the embodiments of the disclosure, some of the one or more reference signal resources indicated by the one or more TCI states of the CORESET are associated with both the serving cell of the terminal and the neighboring cell of the terminal.

It is understandable that in the embodiments of the disclosure, the one or more TCI states of the CORESET are used to indicate that the PDCCH on the CORESET resource and the reference signal(s) indicated by the TCI state(s) are in a Quasi co-located relation or a Quasi co-location relation.

It is further understandable that the neighboring cell involved above may also be understood to be the non-serving cell.

In the beam configuration method according to the embodiments of the disclosure, the one or more TCI states of the CORESET may be associated with the reference signal resources of the neighboring cell and also be associated with the reference signal resources of the serving cell.

In the embodiment of the disclosure, the one or more TCI states of the CORESET are determined. The reference signal resource(s) indicated by the one or more TCI states is/are associated with the serving cell and/or the neighboring cell of the terminal, so that the configuration that the beams of the CORESET are associated with the serving cell and/or the neighboring cell is provided in a scenario in which multi-TRP provides a service to the terminal (i.e., the terminal is configured for transmission with the multi-TRP) in the disclosure.

In the beam configuration method according to the embodiments of the disclosure, the terminal is configured to perform a transmission with the plurality of TRPs.

The transmission performed between the terminal and the plurality of TRPs may be any one of the transmissions using a physical downlink control channel (PDCCH), a physical downlink shared channel (PDSCH), a physical uplink control channel (PUCCH), a physical uplink shared channel (PUSCH), and various reference signals.

In the beam configuration method according to the embodiments of the disclosure, the plurality of TRPs that perform the transmission with the terminal may be TRPs of the neighboring cell of the terminal, may be TRPs of the serving cell of the terminal TRP, or may include both the TRPs of the neighboring cell of the terminal and the TRPs of the serving cell of the terminal TRP.

In the beam configuration method according to the embodiments of the disclosure, when the plurality of TRPs that perform the transmission with the terminal are all the TRPs of the serving cell, the one or more TCI states of the CORESET may be associated with one or more beams of one or more TRPs of the serving cell of the terminal.

In the embodiments of the disclosure, there may be one or more beams of the CORESET. When there is one beam, the beam may switch between beams corresponding to the plurality of TRPs. That is, the beam of the CORESET may correspond to a first TRP at a first moment and correspond to a second TRP at a second moment.

FIG. 3 is a flowchart illustrating a beam configuration method according to an example embodiment. As illustrated in FIG. 3, the beam configuration method is performed by the terminal. The method includes the following.

At step S21, it is determined that one or more reference signal resources indicated by the one or more TCI states are associated with one or more TRPs of the serving cell of the terminal, in response to the terminal being configured to perform a transmission with a plurality of TRPs, and the plurality of TRPs being TRPs of the serving cell of the terminal.

In the beam configuration method according to the embodiments of the disclosure, when the plurality of TRPs that perform the transmission with the terminal include TRPs of a neighboring cell, the one or more TCI states of the CORESET may be associated with one or more beams of the one or more TRPs of the serving cell of the terminal and/or one or more beams of one or more TRPs of the neighboring cell of the terminal.

FIG. 4 is a flowchart illustrating a beam configuration method according to an example embodiment. As illustrated in FIG. 4, the beam configuration method is performed by the terminal. The method includes the following.

At step S31, it is determined that the one or more reference signal resources indicated by the one or more TCI states are associated with one or more TRPs of the serving cell and/or one or more TRPs of the neighboring cell of the terminal, in response to the terminal being configured to perform the transmission with a plurality of TRPs, and the plurality of TRPs include a TRP of the serving cell of the terminal and TRPs of the neighboring cell of the terminal.

In the beam configuration method according to the embodiments of the disclosure, in the case where the one or more TCI states of the CORESET of the terminal are associated with the one or more beams of the one or more TRPs of the serving cell of the terminal and are not associated with the one or more beams of the TRPs of the neighboring cell of the terminal, when there is one of the plurality of TRPs that perform the transmission with the terminal is a TRP of the neighboring cell, one or more reference signals indicated by the one or more TCI states of the CORESET cannot be the neighboring cell's, or, the one or more reference signals indicated by the one or more TCI states of the CORESET cannot be in a Quasi co-location (QCL) type D relationship with any reference signal of the neighboring cell.

In the beam configuration method according to the embodiments of the disclosure, in the case where the one or more TCI states of the CORESET of the terminal are associated with the one or more beams of the one or more TRPs of the neighboring cell of the terminal, the plurality of TRPs that perform the transmission with the terminal may be TRPs of the neighboring cell of the terminal, may be TRPs of the serving cell of the terminal TRP, or may include both the TRP of the neighboring cell of the terminal and the TRP of the serving cell of the terminal TRP.

In the beam configuration method according to the embodiments of the disclosure, the terminal may determine the one or more TCI states of the CORESET based on an indication signaling sent by the network device for indicating the one or more TCI states.

FIG. 5 is a flowchart illustrating a beam configuration method according to an example embodiment. As illustrated in FIG. 5, the beam configuration method is performed by the terminal. The method includes the following.

At step S41, the one or more TCI states are determined based on an indication signaling in response to receiving the indication signaling from a network device.

The indication signaling may be selected from a group including a media access control control element (MAC CE) and/or a Downlink Control Information (DCI).

In an implementation, the indication signaling includes the MAC CE. The MAC CE carries a CORESET identifier (ID) and the one or more TCI states corresponding to the CORESET ID. The reference signals indicated by the TCI states may all be reference signals corresponding to the serving cell, or may all be reference signals corresponding to the neighboring cell, or may include both the reference signal of the serving cell and the reference signal of the neighboring cell.

In an implementation, the indication signaling includes the DCI signaling. A codepoint of the DCI signaling correspond to the one or more TCI states. The reference signals indicated by the TCI states may all be the reference signals corresponding to the serving cell, or may all be the reference signals corresponding to the neighboring cell, or may include the reference signal of the serving cell and the reference signal of the neighboring cell.

The DCI is configured to indicate common beams of a common beam group including the CORESET.

One common beam group includes at least one kind of channel and/or reference signal, and all channels and/or reference signals within the group use the same common beam.

The channel in the common beam group is selected from a group including PDCCH, PDSCH, PUCCH, PUSCH, physical random access channel (PRACH), and physical broadcast channel (PBCH). The PDCCH, the PDSCH, the PUCCH and the PUSCH can be UE specific or non-UE specific.

The reference signal in the common beam group is selected from a group including SSB, channel state information reference signal (CSI-RS), sounding reference signal (SRS), tracking reference signal (TRS), positioning reference signal (PRS) and so on. The CSI-RS includes a CSI-RS for channel state information measurement or a CSI-RS for beam measurement. The SRS includes a SRS for codebook-based and/or non-codebook-based channel state information measurement, a SRS for beam measurement, or a SRS for positioning measurement.

In the beam configuration method according to the embodiments of the disclosure, the terminal may determine the one or more TCI states of the CORESET based on the indication signaling sent by the network device for indicating a new beam reference signal resource set of a new beam. The new beam reference signal resource set is also referred to as candidate beam reference signal resource set.

FIG. 6 is a flowchart illustrating a beam configuration method according to an example embodiment. As illustrated in FIG. 6, the beam configuration method is performed by the terminal. The method includes the following.

At step S51, a target new beam reference signal resource of a target new beam is selected from the new beam reference signal resource set.

At step S52, one or more TCI states corresponding to the target new beam reference signal resource is determined as the one or more TCI states of the CORESET.

In the beam configuration method according to the embodiments of the disclosure, the new beam reference signal resource set may be sent by a network device.

In an implementation, in response to detecting that a beam failure (also known as radio link failure, i.e., the quality of the radio link falls below a certain threshold) has occurred at a first TRP and detecting that a RSRP of a first reference signal resource in the new beam reference signal resource set corresponding to the first TRP is greater than a first threshold, the first reference signal resource is determined as the target new beam reference signal resource and an ID corresponding to the target new beam reference signal resource is reported. The ID of the first reference signal resource may also be understood to be a reference signal resource ID corresponding to the target new beam. The ID of the first reference signal resource may be indicated by a PUSCH MAC CE.

The target new beam corresponds to the first TRP at which the beam failure has occurred, or a second TRP at which no beam failure has occurred, or a third TRP. In this case, the reference signal resource of the new beam for the beam failure recovery corresponding to the first TRP may be a reference signal resource pointing to the second TRP. That is, the new candidate beam reference signal resource set of the new candidate beam corresponding to the first TRP may include reference signal resources corresponding to the second TRP or reference signal resources corresponding to the third TRP. The first reference signal resource is associated with the first TRP. Or, the first reference signal resource is associated with the second TRP. The second TRP and the first TRP are configured to perform the transmission with the terminal. Or, the first reference signal resource is associated with the third TRP, in which the third TRP is a TRP other than the first TRP and the second TRP that are configured to perform the transmission with the terminal, and the third TRP may correspond to the serving cell or the neighboring cell. When there are multiple TRPs that perform the transmission with the terminal, e.g., more than two TRPs, the third TRP may be a TRP other than the TRPs that are configured to perform the transmission with the terminal. The first TRP, the second TRP and the third TRP have different TRP IDs, and/or correspond to different CORESETPoolIndexes, and/or correspond to different cell IDs.

It is further understandable that the CORESET for which the beam configuration is performed in the beam configuration method according to the embodiments of the disclosure includes at least one of CORESET #0 or a CORESET different from the CORESET #0.

The embodiments of the disclosure will be described by taking the configuration process of the TCI state(s) for CORESET #0 as an example. For example, the number of PDCCHs sent by the multi-TRP for the terminal is 2, and the TRPs that perform the transmission with the terminal in the scenario of multi-TRP include the first TRP and the second TRP.

In an implementation, the TCI state(s) of the CORESET #0 can be associated with only the reference signals of the serving cell and includes the following two cases.

In the first case, in the multi-TRP scenario, in which for example, both the first TRP and the second TRP provide services for the terminal, when the first TRP and the second TRP are TRPs corresponding to the serving cell, there can be one or two beams of CORESET #0. When there is one beam of CORESET #0, this beam can switch between the beam corresponding to the first TRP and the beam corresponding to the second TRP.

In the embodiment of the disclosure, the beam indication signaling may be a downlink MAC CE and/or a DCI sent by the network device. If the beam indication signaling includes the MAC CE, the MAC CE carries a CORESET ID and at most two TCI states corresponding to the CORESET ID. The respective reference signal indicated by each TCI state is a reference signal corresponding to the serving cell. If the beam indication signaling includes the DCI signaling, the codepoint of the DCI signaling corresponds to at most two TCI states, and the respective reference signal indicated by each TCI state is a reference signal corresponding to the serving cell. The DCI is configured to indicate the common beams of the common beam group including the CORESET #0. One common beam group includes at least one kind of channel and/or reference signal, and all channels and/or reference signals within the group use the same common beam.

The channels within the group are selected from a group including PDCCH, PDSCH, PUCCH, PUSCH, PRACH, and PBCH. The PDCCH, the PDSCH, the PUCCH and the PUSCH may be UE specific or non-UE specific.

The reference signals within the group are selected from a group including SSB, CSI-RS, SRS, TRS, and PRS. The CSI-RS includes a CSI-RS for channel state information measurement or a CSI-RS for beam measurement. The SRS includes a SRS for codebook-based and/or non-codebook-based channel state information measurement, a SRS for beam measurement, or a SRS for positioning measurement.

The beam indication in the embodiments of the disclosure may be sent based on the terminal. The condition for triggering the sending is that the terminal detects that a beam failure has occurred at a certain TRP. When a beam failure has occurred at the first TRP, the reference signal resources in the new candidate beam reference signal resource set corresponding to the first TRP are detected respectively, and it is determined whether there is a certain reference signal resource to which a L1-RSRP corresponds satisfies a threshold Qin. If there is a reference signal resource to which the L1-RSRP corresponds satisfies the threshold Qin, the ID of the reference signal resource is reported to the base station. The ID of the reference signal resource of the new beam is indicated using a PUSCH MAC CE. The PUSCH MAC CE includes, but is not limited to, a PUSCH MAC CE used to indicate a beam failure recovery per TRP. The new beam corresponds to the first TRP where the beam failure has occurred, or the second TRP where no beam failure has occurred, or the third TRP. The third TRP is not configured to perform the transmission with the terminal. The transmission includes a transmission on at least one kind of physical channel and/or a transmission of the reference signal. The third TRP is a TRP of the serving cell. That is, the reference signal resource of the new beam corresponding to the first TRP for the beam failure recovery may be a reference signal resource pointing to the second TRP. The new candidate beam reference signal resource set corresponding to the first TRP may include reference signal resources corresponding to the second TRP and/or reference signal resources corresponding to the third TRP. The third TRP is a TRP of the serving cell. The first TRP, the second TRP, and the third TRP have different TRP IDs, and/or correspond to different CORESETPoolIndexes, and/or correspond to different cell IDs.

In the second case, in a multi-TRP scenario, in which both the first TRP and the second TRP provide services for the terminal, when any of the first TRP and the second TRP is a TRP corresponding to the neighboring cell, the respective reference signal indicated by each TCI state of the CORESET #0 cannot be a reference signal of the neighboring cell or cannot be in a QCL type D relationship with any reference signal of the neighboring cell.

The beam indication signaling may be a downlink MAC CE and/or a DCI sent by the network device. The beam indication signaling may refer to the first case above, but the respective reference signal resource corresponding to each TCI state cannot be the neighboring cell's.

It is understandable that when the TCI state corresponds to one or more reference signal resources, each of the reference signal resources cannot be the neighboring cell's, or some of the one or more reference signal resources cannot be the neighboring cell's.

In the embodiment of the disclosure, the beam indication signaling may be sent based on the terminal. The condition for triggering the sending is detecting that a beam failure has occurred at a certain TRP. When a beam failure has occurred at the first TRP, the reference signal resources in the new candidate beam reference signal resource set corresponding to the first TRP are detected respectively, and it is determined whether there is a certain reference signal resource to which a L1-RSRP corresponds satisfies a Qin. If there is a reference signal resource to which the L1-RSRP corresponds satisfies the Qin, the ID of the reference signal resource is reported to the base station. The ID of the reference signal resource corresponding to the new beam is indicated using a PUSCH MAC CE. When the first TRP is a TRP of the serving cell and the second TRP is a TRP of the neighboring cell, the new beam corresponds to the first TRP where the beam failure has occurred, or the third TRP that corresponds to the same serving cell as the first TRP, but not the second TRP. However, when the first TRP is a TRP of the neighboring cell and the second TRP is a TRP of the serving cell, the new beam corresponds to the first TRP where the beam failure has occurred, or the second TRP, or the third TRP that corresponds to the same serving cell as the second TRP. The third TRP is not configured to perform the transmission with the terminal. That is, when the first TRP is a TRP of the serving cell and the second TRP is a TRP of the neighboring cell, the new candidate beam reference signal resource set corresponding to the first TRP cannot include any reference signal resource corresponding to the second TRP, but may include reference signal resources corresponding to the third TRP of the same serving cell as the first TRP. When the first TRP is a TRP of the neighboring cell and the second TRP is a TRP of the serving cell, the new candidate beam reference signal resource set corresponding to the first TRP may include reference signal resources corresponding to the second TRP, and may also include reference signal resources corresponding to the third TRP of the same serving cell as the second TRP. The first TRP, the second TRP, and the third TRP have different TRP IDs, and/or correspond to different CORESETPoolIndexes, and/or correspond to different cell IDs.

In another implementation, the TCI state(s) of CORESET #0 can be associated with the reference signal(s) of the neighboring cell, which can be associated with the first TRP and/or the second TRP.

In a multi-TRP scenario, there is one or more beams of CORESET #0. When there is one beam, this beam can switch between a beam corresponding to the first TRP and a beam corresponding to the second TRP.

In the embodiment of the disclosure, the beam indication signaling may be a downlink MAC CE and/or a DCI sent by the network device. The beam indication signaling may refer to the first case above, but the reference signal resource corresponding to the TCI state is the serving cell's and/or the neighboring cell's.

In the embodiment of the disclosure, the beam indication signaling may be sent based on the terminal. The condition for triggering the sending is detecting that a beam failure has occurred at a certain TRP. When the beam failure has occurred at the first TRP, the reference signal resources in the new candidate beam reference signal resource set corresponding to the first TRP are detected respectively, and it is determined whether there is a certain reference signal resource to which a L1-RSRP corresponds satisfies a Qin. If there is a reference signal resource to which the L1-RSRP corresponds satisfies the Qin, the ID of the reference signal resource is reported to the base station. The ID of the reference signal resource of the new beam is indicated using a PUSCH MAC CE. The new beam corresponds to the first TRP where a beam failure has occurred, or the second TRP, or the third TRP. The first TRP is a TRP of the serving cell or a TRP of the neighboring cell, and the second TRP is a TRP of the serving cell or a TRP of the neighboring cell. The third TRP is not configured to perform the transmission with the terminal. The third TRP is a TRP of the serving cell or a TRP of the neighboring cell. The neighboring cell corresponding to the third TRP may be identical to or different from the neighboring cell corresponding to the first TRP and the neighboring cell corresponding to the second TRP. The first TRP, the second TRP, and the third TRP have different TRP IDs, and/or correspond to different CORESETPoolIndexes, and/or correspond to different cell IDs. That is, the reference signal resource of the new beam corresponding to the first TRP for the beam failure recovery may be a reference signal resource pointing to the second TRP. That is, the new candidate beam reference signal resource set corresponding to the first TRP may include reference signal resources corresponding to the second TRP or reference signal resources corresponding to the third TRP. The beam of the CORESET #0 can point to the serving cell or the neighboring cell.

Typically, the beam configuration method according to the embodiments of the disclosure is applicable to determine a cell associated with the reference signal(s) of the TCI state(s) of CORESET #0. The TCI states of a CORESET other than CORESET #0 may be associated with the reference signals of the serving cell or the reference signals of the neighboring cell. The beam configuration of CORESET #0 may include two cases, one case is that it can only be associated with the reference signals of the serving cell, and the other case is that it can be associated with the reference signals of the serving cell and the reference signals of the neighboring cell.

With the beam configuration method according to the embodiments of the disclosure, a method for determining a cell associated with reference signals of TCI states of CORESET #0 is provided, and a method for indicating the TCI states of CORESET #0 is further provided.

Based on the same concept, the embodiments of the disclosure provide a beam configuration method performed by a network device.

FIG. 7 is a flowchart illustrating a beam configuration method according to an example embodiment. As illustrated in FIG. 7, the beam configuration method is performed by the network device. The method includes the following.

At step S61, one or more TCI states of a CORESET are configured for a terminal.

One or more reference signal resources indicated by the one or more TCI states are associated with at least one of the followings: a serving cell of the terminal or a neighboring cell of the terminal.

In one aspect, in the beam configuration method according to the embodiments of the disclosure, the one or more reference signal resources indicated by the one or more TCI states of the CORESET are associated with the serving cell of the terminal.

In the beam configuration method according to the embodiments of the disclosure, the one or more TCI states of the CORESET may be associated with the reference signal resources of the serving cell, but not associated with the reference signal resources of the neighboring cell.

In another aspect, in the beam configuration method according to the embodiments of the disclosure, the one or more reference signal resources indicated by the one or more TCI states of the CORESET are associated with the neighboring cell of the terminal.

In the beam configuration method according to the embodiments of the disclosure, the one or more TCI states of the CORESET may be associated with the reference signal resources of the neighboring cell, but not associated with the reference signal resources of the serving cell.

In still another aspect, in the beam configuration method according to the embodiments of the disclosure, some of the reference signal resources indicated by the one or more TCI states of the CORESET are associated with the serving cell of the terminal, and some of the reference signal resources indicated by the one or more TCI states of the CORESET are associated with the neighboring cell of the terminal In yet another aspect, in the beam configuration method according to the embodiments of the disclosure, some of the reference signal resources indicated by the one or more TCI states of the CORESET are associated with both the serving cell and the neighboring cell of the terminal.

In the beam configuration method according to the embodiments of the disclosure, the one or more TCI states of the CORESET may be associated with the reference signal resources of the neighboring cell and the reference signal resources of the serving cell.

It is understandable that in the beam configuration method according to the embodiments of the disclosure, the CORE- SET includes at least one of the CORESET #0 or a CORE- SET different from the CORESET #0.

It is further understandable that in the embodiment of the disclosure, each of the one or more TCI states of the CORESET is used to indicate a QCL relationship between the PDCCH on the CORESET resource and the reference signal indicated by the TCI state. The QCL relationship may be, for example, a Quasi co-location relation, or a Quasi co-located relation.

It is further understandable that the neighboring cell involved above can also be understood as a non-serving cell.

In an implementation, the terminal is configured to per- form a transmission with a plurality of TRPs. The plurality of TRPs that perform the transmission with the terminal are TRPs of the serving cell of the terminal. The one or more reference signal resources indicated by the one or more TCI states are associated with one or more TRPs of the serving cell of the terminal.

In an implementation, the terminal is configured to per- form a transmission with a plurality of TRPs. The plurality of TRPs that perform the transmission with the terminal are TRPs of the serving cell of the terminal and TRPs of the neighboring cell of the terminal. The one or more reference signal resources indicated by the one or more TCI states are associated with one or more TRPs of the serving cell of the terminal and/or one or more TRPs of the neighboring cell of the terminal.

In an implementation, the network device configures one or more TCI states of the CORESET based on the indication signaling.

FIG. 8 is a flowchart illustrating a beam configuration method according to an example embodiment. As illustrated in FIG. 8, the beam configuration method is performed by the network device. The method includes the following.

At step S71, an indication signaling is sent. The indication signaling is configured to determine the one or more TCI states.

In an implementation, the indication signaling may include a MAC CE and/or a DCI.

In an implementation, the indication signaling includes a MAC CE. The MAC CE carries a CORESET ID and the one or more TCI states corresponding to the CORESET ID. The reference signals indicated by the TCI states may all be reference signals corresponding to the serving cell, or may all be reference signals corresponding to the neighboring cell, or may include both the reference signals of the serving cell and the reference signals of the neighboring cell.

In an implementation, the indication signaling includes DCI signaling. A codepoint of the DCI signaling correspond to the one or more TCI states. The reference signals indi- cated by the TCI states may all be the reference signals corresponding to the serving cell, or may all be the reference signals corresponding to the neighboring cell, or may include the reference signals of the serving cell and the reference signals of the neighboring cell. The DCI is used to indicate the common beams of the group of common beams including the CORESET.

In the beam configuration method according to the embodiments of the disclosure, the network device sends an indication signaling for indicating a new beam reference signal resource set of a new beam, to enable the terminal to determine the one or more TCI states of the CORESET.

In the beam configuration method according to the embodiments of the disclosure, the new beam reference signal resource set may be sent by the network device.

FIG. 9 is a flowchart illustrating a beam configuration method according to an example embodiment. As illustrated in FIG. 9, the beam configuration method is performed by the network device. The method includes the following.

At step S81, a new beam reference signal resource set is sent.

The new beam reference signal resource set is used by the terminal to determine a target new beam reference signal resource. The target new beam reference signal resource corresponds to the one or more TCI states of the CORESET.

FIG. 10 is a flowchart illustrating a beam configuration method according to an example embodiment. As illustrated in FIG. 10, the beam configuration method is performed by the network device. The method includes the following.

At step S91, an ID of the target new beam reference signal resource is received.

The ID of the target new beam reference signal resource is reported by the terminal in response to detecting that a beam failure has occurred at a first TRP, and detecting that there is a first reference signal resource to which a RSRP corresponds is greater than a first threshold in the new beam reference signal resource set corresponding to the first TRP. The first reference signal resource is the target new beam reference signal resource.

The beam failure that has occurred at the first TRP may also be referred to as radio link failure at the first TRP, i.e., the quality of the radio link at the first TRP is less than a certain threshold.

In an implementation, the first reference signal resource is associated with the first TRP. Or, the first reference signal resource is associated with the second TRP. The second TRP and the first TRP are configured to perform the transmission with the terminal. Or, the first reference signal resource is associated with the third TRP, in which the third TRP is a TRP other than the first TRP and the second TRP that are configured to perform the transmission with the terminal. The third TRP is not configured to perform the transmission with the terminal. The third TRP is a TRP of the serving cell or a TRP of the neighboring cell. The neighboring cell corresponding to the third TRP may be identical to or different from the neighboring cell corresponding to the first TRP and the neighboring cell corresponding to the second TRP. The first TRP, the second TRP, and the third TRP have different TRP IDs, and/or correspond to different CORE- SETPoolIndexes, and/or correspond to different cell IDs.

It is understandable that the beam configuration method performed by a network device according to the embodi- ments of the disclosure is similar to the beam configuration method performed by a terminal, and the similar descrip- tions will not be repeated herein.

It is further understandable that the beam configuration method according to the embodiments of the disclosure can be applied to an implementation process in which the terminal and the network device interact for implementing beam configuration. In the implementation process, the terminal and the network device are each equipped with relevant functions for realizing the above embodiments, which will not be repeated herein.

It is noteworthy that those skilled in the art understand that various embodiments/examples involved above in the embodiments of the disclosure can be used in combination with the foregoing embodiments or can be used indepen- dently. Whether they are used alone or in combination with the foregoing embodiments, the implementation principles are similar. Some of the embodiments of the disclosure are illustrated as implementations that are used together. Certainly, those skilled in the art understand that such illustrative description is not a limitation of the embodiments of the disclosure.

Based on the same concept, the embodiments of the disclosure also provide a beam configuration apparatus.

It is understandable that the beam configuration apparatus according to the embodiments of the disclosure includes hardware structures and/or software modules for performing respective functions in order to achieve the above functions. In combination with the units and algorithmic steps of the various examples disclosed in the embodiments of the disclosure, the embodiments of the disclosure can be implemented in the form of hardware or a combination of hardware and computer software. Whether a particular function is performed by hardware or by a way of driving hardware by computer software depends on the particular application and design constraints of the technical solution. Those skilled in the art may use different methods for each particular application to implement the described functions, but such implementation should not be considered as beyond the scope of the technical solutions of the embodiments of the disclosure.

FIG. 11 is a block diagram illustrating a beam configuration apparatus 100 according to an example embodiment. As illustrated in FIG. 11, the beam configuration apparatus 100 is applied to a terminal. The apparatus includes: a processing unit 101.

The processing unit 101 is configured to determine one or more TCI states of a CORESET. One or more reference signal resources indicated by the one or more TCI states are associated with at least one of a serving cell of the terminal or a neighboring cell of the terminal.

In an implementation, the terminal is configured to perform a transmission with a plurality of TRPs. The plurality of TRPs are TRPs of the serving cell of the terminal, and the one or more reference signal resources indicated by the one or more TCI states are associated with one or more TRPs of the serving cell of the terminal.

In an implementation, the terminal is configured to perform a transmission with a plurality of TRPs, The plurality of TRPs include a TRP of the serving cell of the terminal and TRPs of the neighboring cell of the terminal, and the one or more reference signal resources indicated by the one or more TCI states are associated with one or more TRPs of the serving cell and/or the neighboring cell of the terminal.

In an implementation, the apparatus 100 includes: a receiving unit 102. The receiving unit 102 is configured to receive an indication signaling from a network device. The indication signaling is configured to determine the one or more TCI states.

In an implementation, the indication signaling includes a MAC CE. The MAC CE includes a CORESET ID and the one or more TCI states corresponding to the CORESET ID.

In an implementation, the indication signaling includes a DCI. A codepoint of the DCI corresponds to the one or more TCI states, and the DCI is configured to determine common beams of a common beam group including the CORESET.

In an implementation, the processing unit is configured to: select a target new beam reference signal resource from a new beam reference signal resource set; and determine one or more TCI states corresponding to the target new beam reference signal resource as the one or more TCI states of the CORESET.

In an implementation, the apparatus 100 includes: a sending unit 103. The sending unit 103 is configured to, in response to detecting that a beam failure has occurred at a first TRP and detecting that there is a first reference signal resource to which a RSRP corresponds is greater than a first threshold in the new beam reference signal resource set corresponding to the first TRP, determine the first reference signal resource as the target new beam reference signal resource, and report an ID corresponding to the target new beam reference signal resource.

In an implementation, the first reference signal resource is associated with the first TRP. Or, the first reference signal resource is associated with a second TRP. The second TRP and the first TRP are configured to perform the transmission with the terminal. Or, the first reference signal resource is associated with a third TRP, in which the third TRP is a TRP other than the first TRP and the second TRP that are configured to perform the transmission with the terminal.

The third TRP is not configured to perform a transmission with the terminal. The third TRP is a TRP of the serving cell or the neighboring cell. The neighboring cell corresponding to the third TRP may be identical to or different from the neighboring cell corresponding to the first TRP and the neighboring cell corresponding to the second TRP. The first TRP, the second TRP and the third TRP have different TRP IDs, and/or correspond to different CORESETPoolIndexes, and/or correspond to different cell IDs.

In an implementation, the CORESET includes at least one of CORESET #0 or a CORESET different from the CORESET #0.

Figure 12:
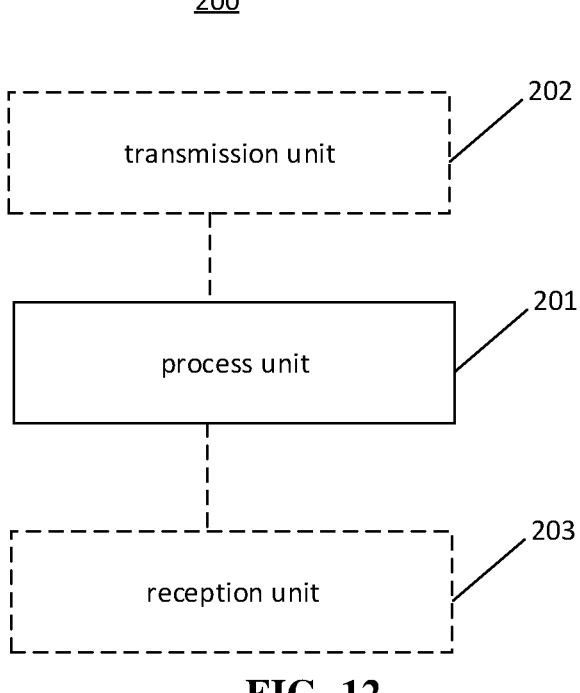
FIG. 12 is a block diagram illustrating a beam configuration apparatus according to an example embodiment.

FIG. 12 is a block diagram illustrating a beam configuration apparatus 200 according to an example embodiment. As illustrated in FIG. 12, the beam configuration apparatus 200 is applied to a network device. The apparatus includes: a process unit 201.

The process unit 201 is configured to configure one or more TCI states of a CORESET. One or more reference signal resources indicated by the one or more TCI states are associated with at least one of a serving cell of the terminal or a neighboring cell of the terminal.

In an implementation, the terminal is configured to perform a transmission with a plurality of TRPs. The plurality of TRPs are TRPs of the serving cell of the terminal, and the one or more reference signal resources indicated by the one or more TCI states are associated with one or more TRPs of the serving cell of the terminal.

In an implementation, the terminal is configured to perform a transmission with a plurality of TRPs. The plurality of TRPs include a TRP of the serving cell of the terminal and TRPs of the neighboring cell of the terminal, and the one or more reference signal resources indicated by the one or more TCI states are associated with one or more TRPs of the serving cell and/or the neighboring cell of the terminal.

In an implementation, the apparatus 200 includes a transmission unit 202. The transmission unit 202 is configured to send an indication signaling. The indication signaling is configured to determine the one or more TCI states.

In an implementation, the indication signaling includes a MAC CE. The MAC CE includes a CORESET ID and one or more TCI states corresponding to the CORESET ID.

In an implementation, the indication signaling includes a DCI. A codepoint of the DCI corresponds to one or more TCI states, and the DCI is configured to determine common beams of a common beam group including the CORESET.

In an implementation, the apparatus includes the transmission unit 202. The transmission unit 202 is configured to: send a new beam reference signal resource set. The new beam reference signal resource set is used by the terminal to determine a target new beam reference signal resource, and the target new beam reference signal resource corresponds to the one or more TCI states of the CORESET.

In an implementation, the apparatus includes: a reception unit 203. The reception unit 203 is configured to: receive an ID of the target new beam reference signal resource. The ID of the target new beam reference signal resource is sent by the terminal in response to detecting that a beam failure has occurred at a first TRP, and detecting that there is a first reference signal resource to which a RSRP corresponds is greater than a first threshold in the new beam reference signal resources corresponding to the first TRP, in which the first reference signal resource is the target new beam reference signal resource.

In an implementation, the first reference signal resource is associated with the first TRP. Or, the first reference signal resource is associated with a second TRP. The second TRP and the first TRP are configured to perform the transmission with the terminal. Or, the first reference signal resource is associated with a third TRP, in which the third TRP is a TRP other than the first TRP and the second TRP that are configured to perform the transmission with the terminal. The third TRP is not configured to perform a transmission with the terminal. The third TRP is a TRP of the serving cell or the neighboring cell. The neighboring cell corresponding to the third TRP may be identical to or different from the neighboring cell corresponding to the first TRP and the neighboring cell corresponding to the second TRP. The first TRP, the second TRP and the third TRP have different TRP IDs, and/or correspond to different CORESETPoolIndexes, and/or correspond to different cell IDs.

In an implementation, the CORESET includes at least one of CORESET #0 or a CORESET different from the CORESET #0.

Regarding the apparatuses in the above embodiments, the specific way in which each module performs its operation has been described in detail in the method embodiments, and will not be described in detail here.

Figure 13:
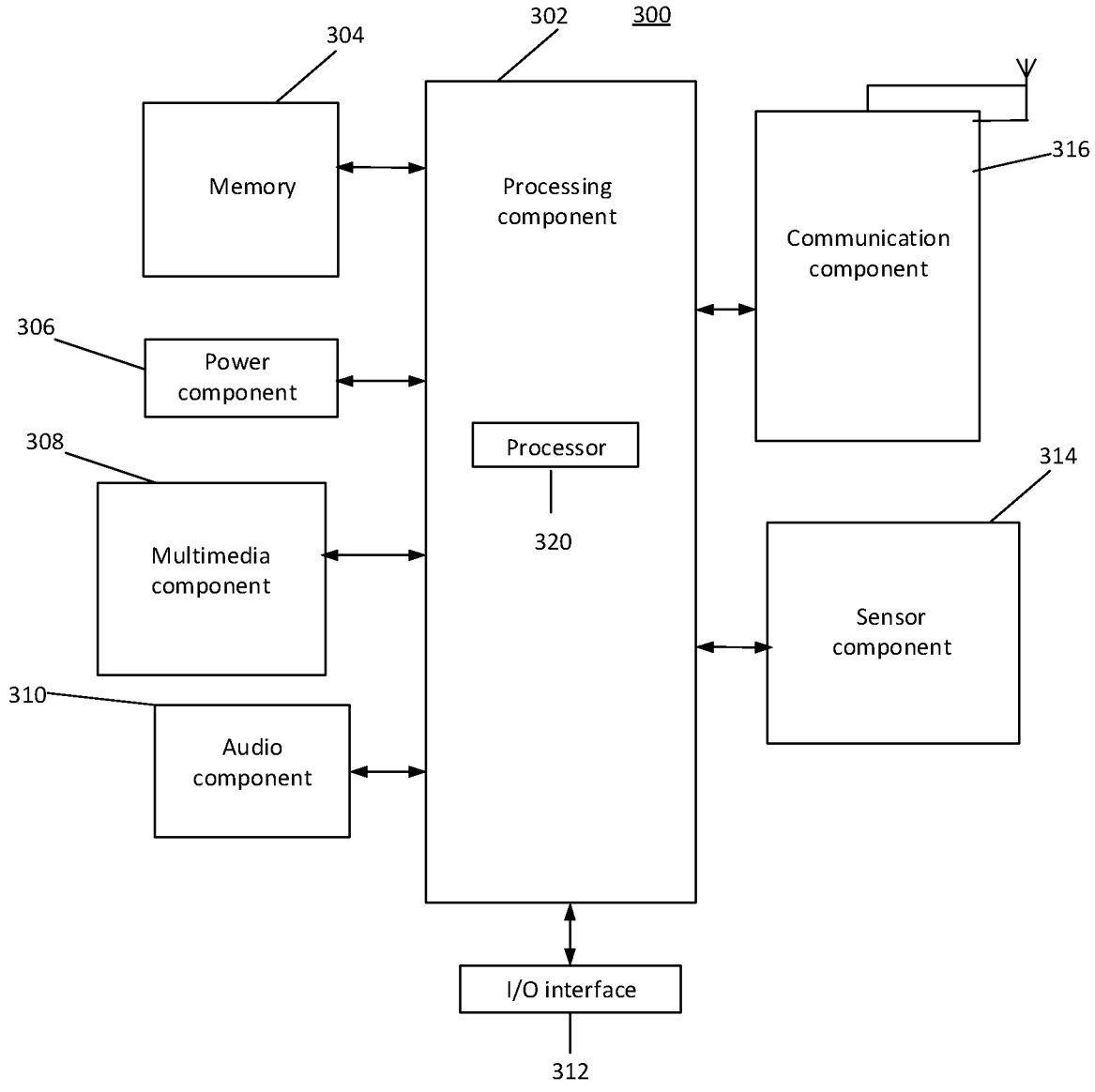
FIG. 13 is a block diagram illustrating a device for beam configuration according to an example embodiment.

FIG. 13 is a block diagram illustrating a device 300 for beam configuration according to an example embodiment. For example, the device 300 may be a mobile phone, a computer, a digital broadcasting terminal, a message transceiver device, a game console, a tablet device, a medical device, a fitness device and a PDA.

As illustrated in FIG. 13, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone call, data communication, camera operation, and recording operation. The processing component 302 may include one or more processors 320 to perform instructions to implement all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a calling mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of a user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In an embodiment, the communication component 316 receives a broadcast signal from an external broadcast management system or broadcast associated information via a broadcast channel. In an embodiment, the communication component 316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiment, the device 300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the embodiments, there is also provided a non-transitory computer readable storage medium including instructions, such as the memory 304, executable by the processor 320 in the device 300, for implementing the above methods. For example, the non-transitory computer-readable storage medium may be a ROM, a Random Access Memory (RAM), a CD-ROM, a magnetic tape, a floppy disc, and an optical data storage device.

Figure 14:
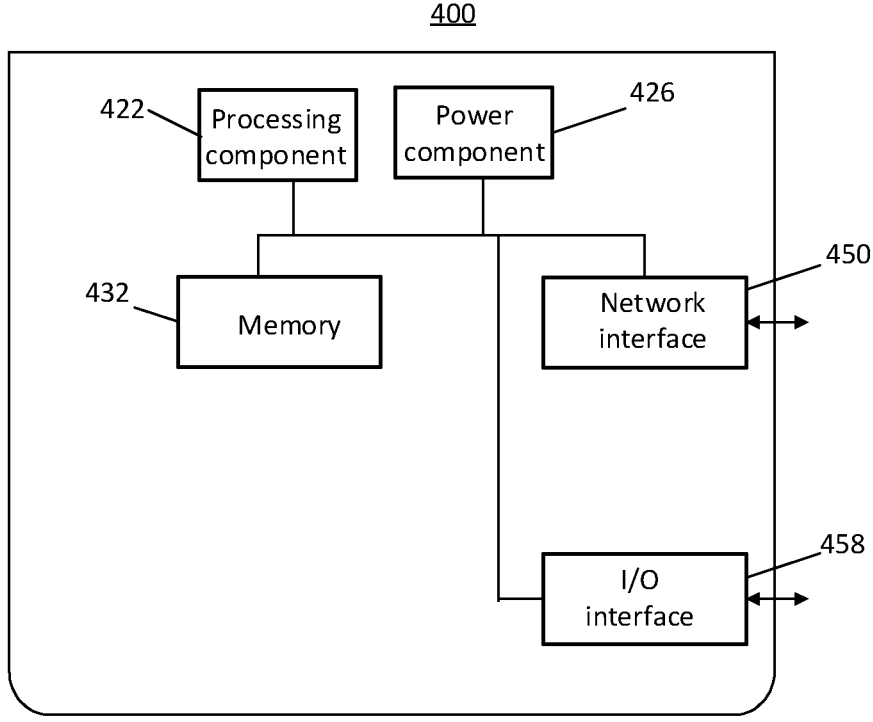
FIG. 14 is a block diagram illustrating a device for beam configuration according to an example embodiment.

FIG. 14 is a block diagram illustrating a device 400 for beam configuration according to an example embodiment. For example, the device 400 may be provided as a network device. As illustrated in FIG. 14, the device 400 includes a processing component 422 including one or more processors, and memory resources represented by a memory 432 for storing instructions that can be executed by the processing component 422, such as applications. The application programs stored in the memory 432 may include one or more modules each corresponding to a set of instructions. In addition, the processing component 422 is configured to execute the instructions to perform the methods described above.

The device 400 may also include a power component 426 configured to perform power management of the device 400, a wired or wireless network interface 450 configured to connect the device 400 to a network, and an I/O interface 458. The device 400 may operate on an operating system stored in the memory 432, such as Windows Server™, Mac OS X™, Unix™, Linux™, FreeBSD™, or the like.

In the embodiments, there is also provided a non-transitory computer readable storage medium including instructions, such as the memory 432, executable by the processor 422 in the device 400, for implementing the above methods. For example, the non-transitory computer-readable storage medium may be a ROM, a RAM, a CD-ROM, a magnetic tape, a floppy disc, and an optical data storage device.

The technical solutions according to the embodiments of the disclosure may include the following beneficial effects. The one or more TCI states of the CORESET can be determined. The one or more reference signal resources indicated by the one or more TCI states are associated with the serving cell and/or the neighboring cell of the terminal. The disclosure can realize beam configuration of CORESET in the scenario in which the Multi-TRP is used to provide services to the terminal.

It is further understandable that the term "multiple" in the disclosure refers to two or more, which is the similar for other quantifiers. The term "and/or" describes a relation of associated objects, which indicates three relations, for example, "A and/or B" indicates that A exists alone, A and B both exist, and B exists alone. The character "/" generally indicates that the associated objects prior to and after the character "/" is an "or" relation. The terms "a", "said" and "the" in the singular form are also intended to include the plural form, unless the context clearly indicates otherwise.

It is further understandable that the terms "first", "second", etc. are used to describe various types of information, but that such information should not be limited to these terms. These terms are used only to distinguish information of the same type from each another and do not indicate a particular order or degree of importance. In fact, the expressions "first" and "second" can be used interchangeably. For example, without departing from the scope of this disclosure, first information may also be referred to as second information, and similarly, second information may also be referred to as first information.

It is further understandable that although the operations are depicted in the accompanying drawings in a particular order in the embodiments of the disclosure, this should not be construed as requiring that the operations be performed in the particular sequence shown or in a serial sequence, or that all of the operations shown be performed to obtain the desired results. Multitasking and parallel processing may be advantageous in particular environments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and embodiments are considered as examples only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for beam configuration, performed by a user equipment (UE), comprising:

determining one or more transmission configuration indication (TCI) states of a control resource set (CORESET) based on downlink control information (DCI);

wherein one or more reference signal resources indicated by the one or more TCI states are associated with at least one of:

a serving cell of the UE; and a non-serving cell of the UE, wherein the CORESET comprises at least one of a CORESET with index 0 or a CORESET other than a CORESET with index 0, for the CORESET being the CORESET with index 0, the one or more reference signal resources indicated by the one or more TCI states are associated with the serving cell of the UE, or the one or more reference signal resources indicated by the one or more TCI states are associated with at least one of the serving cell of the UE and the non-serving cell of the UE;

for the CORESET being a CORESET other than the CORESET with index 0, the one or more reference signal resources indicated by the one or more TCI states are associated with at least one of the serving cell of the UE and the non-serving cell of the UE.

2. The method of claim 1, wherein the UE is configured to perform transmission with a plurality of transmission and reception points (TRPs), the plurality of TRPs are TRPs of the serving cell of the UE, and the one or more reference signal resources indicated by the one or more TCI states are associated with one or more TRPs of the serving cell of the UE.

3. The method of claim 1, wherein determining the one or more TCI states of the CORESET based on the DCI comprises:

receiving the DCI from a network device, and determining the one or more TCI states based on the DCI.

4. The method of claim 3, wherein a codepoint of the DCI corresponds to the one or more TCI states and the DCI is configured to determine a common beam of a common beam group comprising the CORESET.

5. The method of claim 1, wherein determining the one or more TCI states of the CORESET comprises:

selecting a target new beam reference signal resource from a new beam reference signal resource set; and determining one or more TCI states corresponding to the target new beam reference signal resource as the one or more TCI states of the CORESET.

6. The method of claim 5, further comprising:

detecting that a beam failure has occurred at a first transmission and reception point (TRP), detecting that a reference signal received power (RSRP) corresponding to a first reference signal resource in the new beam reference signal resource set corresponding to the first TRP is greater than a first threshold, determining the first reference signal resource as the target new beam reference signal resource, and reporting an identifier corresponding to the target new beam reference signal resource.

7. The method of claim 6, wherein, the first reference signal resource is associated with the first TRP; or the first reference signal resource is associated with a second TRP, wherein the second TRP and the first TRP are configured to perform transmission with the UE; or the first reference signal resource is associated with a third TRP, wherein the third TRP is a TRP other than the first TRP and the second TRP that are configured to perform transmission with the UE.

8. A user equipment (UE), comprising:

a processor; and a memory for storing instructions executable by the processor;

wherein the processor is configured to: determine one or more transmission configuration indication (TCI) states of a control resource set (CORESET) based on downlink control information (DCI);

wherein one or more reference signal resources indicated by the one or more TCI states are associated with at least one of:

a serving cell of the UE; or and a non-serving cell of the UE, wherein the CORESET comprises at least one of a CORESET with index 0 or a CORESET other than a CORESET with index 0, in a case that the CORESET is the CORESET with index 0, the one or more reference signal resources indicated by the one or more TCI states are associated with the serving cell of the UE, or the one or more reference signal resources indicated by the one or more TCI states are associated with at least one of the serving cell of the UE and the non-serving cell of the UE;

in a case that the CORESET is a CORESET other than a CORESET with index 0, the one or more reference signal resources indicated by the one or more TCI states are associated with at least one of the serving cell of the UE and the non-serving cell of the UE.

9. The method of claim 1, wherein the UE is configured to perform transmission with a plurality of transmission and reception points (TRPs), the plurality of TRPs comprise a TRP of the serving cell of the UE and TRPs of the non-serving cell of the UE, and the one or more reference signal resources indicated by the one or more TCI states are associated with at least one of one or more TRPs of the serving cell of the UE or one or more TRPs of the non-serving cell of the UE.

10. A non-transitory computer-readable storage medium, having instructions stored thereon, wherein when the instructions are executed by a processor of a user equipment (UE), the UE is caused to perform the beam configuration method of claim 1.

11. A method for beam configuration, performed by a network device, comprising:

configuring one or more transmission configuration indication (TCI) states of a control resource set (CORESET) for a user equipment (UE) based on downlink control information (DCI);

wherein one or more reference signal resources indicated by the one or more TCI states are associated with at least one of:

a serving cell of the UE; or a non-serving cell of the UE, wherein the CORESET comprises at least one of a CORESET with index 0 or a CORESET other than a CORESET with index 0, for the CORESET being the CORESET with index 0, the one or more reference signal resources indicated by the one or more TCI states are associated with the serving cell of the UE, or the one or more reference signal resources indicated by the one or more TCI states are associated with at least one of the serving cell of the UE and the non-serving cell of the UE;

for the CORESET being a CORESET other than a CORESET with index 0, the one or more reference signal resources indicated by the one or more TCI states are associated with at least one of the serving cell of the UE and the non-serving cell of the UE.

12. The method of claim 11, wherein the UE is configured to perform transmission with a plurality of transmission and reception points (TRPs), the plurality of TRPs are TRPs of the serving cell of the UE, and the one or more reference signal resources indicated by the one or more TCI states are associated with one or more TRPs of the serving cell of the UE.

13. The method of claim 11, wherein configuring the one or more TCI states of the CORESET based on the DCI comprises:

sending the DCI, wherein the DCI is configured to determine the one or more TCI states.

14. The method of claim 13, wherein a codepoint of the DCI corresponds to the one or more TCI states, and the DCI is configured to determine a common beam of a common beam group comprising the CORESET.

15. The method of claim 11, wherein configuring the one or more TCI states of the CORESET for the UE comprises:

sending a new beam reference signal resource set;

wherein the new beam reference signal resource set is used by the UE to determine a target new beam reference signal resource, and the target new beam reference signal resource corresponds to the one or more TCI states of the CORESET.

16. The method of claim 15, further comprising:

receiving an identifier of the target new beam reference signal resource;

wherein the identifier of the target new beam reference signal resource is reported by the UE detecting that a beam failure has occurred at a first transmission and reception point (TRP), and detecting that a reference signal received power (RSRP) corresponding to a first reference signal resource in the new beam reference signal resource set corresponding to the first TRP is greater than a first threshold, wherein the first reference signal resource is the target new beam reference signal resource.

17. The method of claim 16, wherein the first reference signal resource is associated with the first TRP; or

24 the first reference signal resource is associated with a second TRP, wherein the second TRP and the first TRP are configured to perform transmission with the UE; or the first reference signal resource is associated with a third TRP, wherein the third TRP is a TRP other than the first TRP and the second TRP that are configured to perform transmission with the UE.

18. A network device, comprising:

a processor; and a memory for storing instructions executable by the processor;

wherein the processor is configured to perform the beam configuration method of claim 11.

19. A non-transitory computer-readable storage medium, having instructions stored thereon, wherein when the instructions are executed by a processor of a network device, the network device is caused to perform the beam configuration method of claim 11.

20. The method of claim 11, wherein the UE is configured to perform transmission with a plurality of transmission and reception points (TRPs), the plurality of TRPs comprise TRPs of the serving cell of the UE and TRPs of the non-serving cell of the UE, and the one or more reference signal resources indicated by the one or more TCI states are associated with at least one of one or more TRPs of the serving cell of the UE or one or more TRPs of the non-serving cell of the UE.

* * * * *